(12) United States Patent
Wu et al.

(10) Patent No.: US 8,580,372 B2
(45) Date of Patent: *Nov. 12, 2013

(54) OPTICAL FILM

(75) Inventors: Ting-Yuang Wu, Kaohsiung (TW); Hsung-Hsing Wang, Kaohsiung (TW); Yi-Chia Wang, Kaohsiung (TW)

(73) Assignee: Eternal Chemical Co., Ltd., Kaohsiung (TW)

( * ) Notice: Subject to any disclaimer, the term of this patent is extended or adjusted under 35 U.S.C. 154(b) by 52 days.

This patent is subject to a terminal disclaimer.

(21) Appl. No.: 12/267,327

(22) Filed: Nov. 7, 2008

(65) Prior Publication Data

US 2009/0122577 A1 May 14, 2009

(30) Foreign Application Priority Data

Nov. 9, 2007 (TW) .............................. 96142766 A

(51) Int. Cl.
| | |
|---|---|
| B32B 5/16 | (2006.01) |
| B32B 3/00 | (2006.01) |
| D06N 7/04 | (2006.01) |
| F21V 7/04 | (2006.01) |
| G02B 5/02 | (2006.01) |

(52) U.S. Cl.
USPC ........... 428/156; 428/141; 428/167; 428/323; 428/327; 428/403; 428/407; 359/454; 359/599; 359/669; 359/670; 359/831; 362/339; 362/618; 362/620; 362/627

(58) Field of Classification Search
USPC ......... 428/327, 403, 407, 323, 141, 156, 167; 359/599, 454, 669, 670, 831; 362/618, 362/620, 627
See application file for complete search history.

(56) References Cited

U.S. PATENT DOCUMENTS

| 5,626,800 A | 5/1997 | Williams et al. |
| 6,280,063 B1 | 8/2001 | Fong et al. |

(Continued)

FOREIGN PATENT DOCUMENTS

| JP | 8043634 | 2/1996 |
| JP | 2008-102497 | * 5/2008 |

(Continued)

OTHER PUBLICATIONS

Machine English Translation of CN 101004461, provided by SIPO website, internet retrieval date of Sep. 28, 2012.*
Machine English Tranlation of JP 8043634, provided by the JPO website, Internet Retrieval date of Sep. 28, 2012.*

(Continued)

*Primary Examiner* — Jonathan Langman
(74) *Attorney, Agent, or Firm* — WPAT, P.C.; Anthony King

(57) ABSTRACT

The present invention provides an optical film comprising a substrate having a first optical surface and a second surface and a micro structure layer on the first optical surface of the substrate, wherein the micro structure layer comprises a plurality of first light-adjusting structures selected from the group consisting of prism columnar structures, conical columnar structures, solid angle structures and orange-segment like structures and a combination thereof and a plurality of second light-adjusting structures selected from the group consisting of arc columnar structures, lens-like structures, and capsule-like structures and a combination thereof, wherein at least a portion of the second light-adjusting structures has a height greater than those of all the first light-adjusting structures. The optical film of the present invention will not suffer the damage caused on the microstructure layers while achieving a light-gathering effect and effectively reducing optical interference.

24 Claims, 11 Drawing Sheets

(56) References Cited

U.S. PATENT DOCUMENTS

| | | | |
|---|---|---|---|
| 6,723,772 B2 * | 4/2004 | Maekawa | 524/314 |
| 7,891,856 B2 * | 2/2011 | Chuang et al. | 362/627 |
| 2003/0162860 A1 | 8/2003 | Ohno et al. | |
| 2006/0146571 A1 * | 7/2006 | Whitney | 362/615 |
| 2006/0291064 A1 | 12/2006 | Yao et al. | |
| 2007/0010594 A1 * | 1/2007 | Wang et al. | 522/182 |
| 2007/0086086 A1 * | 4/2007 | Cassarly et al. | 359/362 |
| 2007/0087167 A1 * | 4/2007 | Yoshida | 428/143 |
| 2008/0247191 A1 * | 10/2008 | Hsu | 362/612 |
| 2009/0021667 A1 * | 1/2009 | Horiguchi et al. | 349/64 |

FOREIGN PATENT DOCUMENTS

| | | | |
|---|---|---|---|
| KR | 20040070717 | 8/2004 | |
| KR | 20-0434117 | 12/2006 | |
| KR | 10-2007-0040957 | 4/2007 | |
| TW | M280484 | 7/1994 | |
| TW | I287116 | 6/1995 | |
| TW | M291542 | 6/2006 | |
| TW | 2874533 Y | 2/2007 | |
| TW | 1924620 A | 3/2007 | |
| TW | 1996099 A | 7/2007 | |
| TW | 101004461 A | 7/2007 | |
| WO | 2006/073644 A1 | 7/2006 | |
| WO | WO2006109818 | * 10/2006 | G02B 5/02 |

OTHER PUBLICATIONS

Search Report dated Jun. 2, 2010 for 096142766 which is a corresponding Chinese application that cites TWM280484, US2007/0010594A1, and TWI287166. US2006/0291064A1 corresponds to TWI287116.

Office Action of corresponding KR application No. 2008-0110920 dated Dec. 27, 2011.

English translation of corresponding KR application No. 2008-0110920 dated Dec. 27, 2011.

English translation of JP 8043634, KR 20-0434117, KR20040070717, and KR 10-2007-0040957.

Office Action from Korean corresponding application No. 10-2008-0110920, dated Nov. 27, 2012 cites JP08-043634, KR 20-0434117, KR 10-2004-0070717, KR 10-2007-0040957 and KR 10-2002-0081358.

English Translation of Office Action from Korean corresponding application No. 10-2008-0110920, dated Nov. 27, 2012.

KR 10-2002-0081358 corresponds to US 2003/162860.

Chinese Office Action dated Oct. 10, 2008 for 2007101887686, which is a corresponding Chinese application, that cites CN1996099A, CN101004461A, and CN1924620A.

Chinese Office Action dated Aug. 4, 2010 for 200910160566.X, which is a corresponding divisional Chinese application of 2007101887686, that cites CN2874533Y, CN1996099A, CN101004461A, and WO2006/073644A1.

* cited by examiner 71　72　　　　　　　　　　73

602
601

OPTICAL FILM

BACKGROUND OF THE INVENTION

1. Field of the Invention

The present invention relates to an optical film, particularly, a brightness enhancement film for use in liquid crystal displays.

2. Description of the Prior Art

Conventionally known backlight modules for liquid crystal displays (LCDs) mainly utilize diffusion plates, diffusion films, and light-gathering films to achieve the purposes of homogenizing and gathering light. The main function of the diffusion plates and diffusion films is to provide liquid crystal displays with a uniform surface light. The main function of a light-gathering film, also referred to as brightness enhancement film or prism film in the industry, is to gather the scattered light rays in all directions by refraction and internal total reflection and converge the light rays in the on-axis direction of about ±35 degrees to enhance the luminance of LCDs. Normally, the brightness enhancement film achieves the effect of gathering light by means of regularly or irregularly arranged linear prismatic structures.

FIG. 1 is a schematic diagram of a conventional brightness enhancement film (as disclosed in PCT 96/23649 and U.S. Pat. No. 5,626,800). As shown in FIG. 1, the brightness enhancement film comprises a substrate 1 and a plurality of prism structures 2 on the substrate 1; the prism structures are parallel to each other and each prism structure is composed of two slant surfaces, where the two slant surfaces meet at the top of the prism to form a peak 3, and each surface meets with the another slant surface of an adjacent prism to form a pit 4.

In order to further integrate the light-gathering and light-diffusion functions, as shown in FIG. 2, U.S. Pat. No. 6,280,063 discloses a brightness enhancement film 20 which comprises a substrate 22, linear columnar structures having blunted and rounded peaks 26 on one side of the substrate 22, and irregular diffusion materials 24 on the other side of the substrate 22, as so as achieve the purposes of gathering and homogenizing light.

It is known that the refracted light rays from the brightness enhancement film having regularly arranged columnar structures will optically interfere with the refracted or reflected light rays from other films of the displays or with other light rays refracted or reflected by the brightness enhancement film itself, thereby resulting in Moiré or Newton ring in appearance. TW Patent No. M291542 discloses serpentine optical adjustment elements for reducing the light interference and achieving the purposes of gathering and homogenizing light. As shown in FIG. 3(a) and FIG. 3(b), the serpentine optical adjustment element comprises a substrate 31 and serpentine microstructures 33, where the substrate 31 has a first optical surface 311 and a second optical surface 313, and the serpentine microstructures 33 are arranged on the first optical surface 311 and have a diffusion part 331 and light-gathering part 333. FIG. 3(b) shows a top view of the serpentine optical adjustment element of FIG. 3(a). As shown in FIG. 3(b), the diffusion part 331 and light-gathering part 333 are in the form of continuously bending curves so as to alleviate optical interference.

It is known that when the prism structures of the brightness enhancement film are in contact with panels or other optical films, scratching tends to occur, thereby affecting the optical properties. Presently, the main solution adopted in the industry is to use a protective diffusion film (which is also referred to as an "upper diffusion film") to avoid the impairment between the brightness enhancement film and the panels or other optical films caused by the vibration during transportation. In addition to utilizing the protective diffusion film to avoid the scratching caused by the contact between the brightness enhancement film and the panels, before packaging, it is necessary to adhere a protective film onto the brightness enhancement film to avoid the impairment caused during the storage and/or transportation of the brightness enhancement film. Nevertheless, the utilization of a protective diffusion film and protective film will increase the cost. Although the linear columnar structures having blunted and rounded peaks disclosed in the above-mentioned U.S. Pat. No. 6,280,063 may reduce the impairment of the brightness enhancement film caused by the contact between the prism structures of the brightness enhancement film and other films or panels and enhance the abrasion resistance property, the light-gathering effect of blunted and rounded columnar structures is not as good as that of prism columnar structures. Although TW Patent No. M291542 discloses optical adjustment elements having arc columnar structures (i.e., the diffusion part) and prism columnar structures (i.e., the light-gathering part) to achieve the purposes of gathering and homogenizing light, as discussed above, however, the prism columnar structures are easy to be scratched due to the contact with other films or panels and the abrasion resistance property is poor.

Given the above, the present invention provides an optical film to obviate the above-mentioned shortcomings. The present invention alleviates the scratch caused by the contact between the optical film and other optical films or panels and can reduce the cost associated with any upper diffusion film or adhered protective film.

SUMMARY OF THE INVENTION

The primary object of the present invention is to provide an optical film comprising a substrate having a first optical surface and a second surface and a microstructure layer on the first optical surface of the substrate, wherein the microstructure layer comprises a plurality of first light-adjusting structures selected from the group consisting of prism columnar structures, conical columnar structures, solid angle structures and orange-segment like structures and a combination thereof and a plurality of second light-adjusting structures selected from the group consisting of arc columnar structures, lens-like structures, and capsule-like structures and a combination thereof, wherein at least a portion of the second light-adjusting structures has a height greater than those of all the first light-adjusting structures.

BRIEF DESCRIPTION OF THE DRAWINGS

FIG. 7(*b*) shows a further embodiment of the optical film of FIG. 6(*a*).

DETAILED DESCRIPTION OF THE INVENTION

Figure 1:
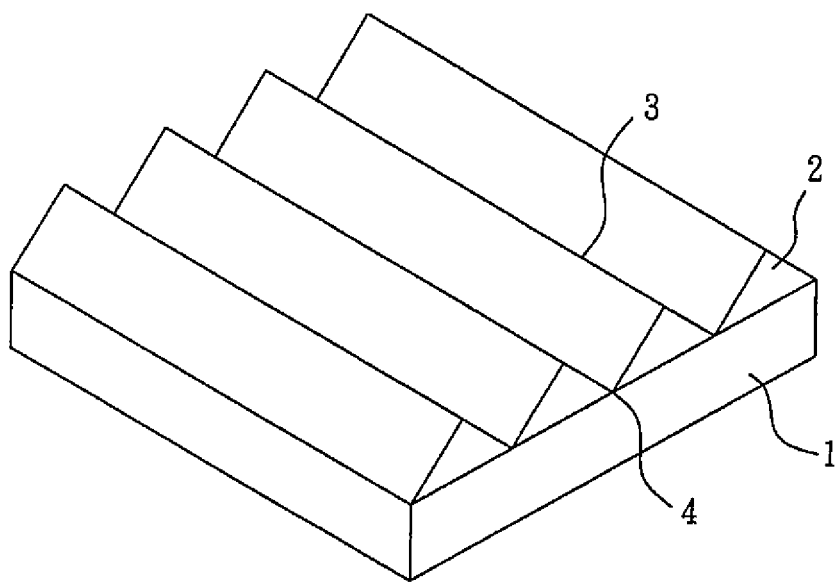
FIG. 1 is a schematic view of a conventional brightness enhancement film.
Figure 2:
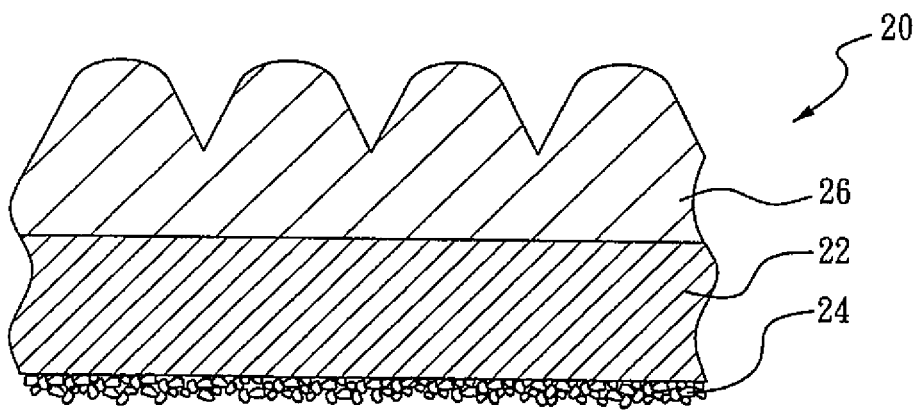
FIG. 2 is a schematic view of a conventional brightness enhancement film.
Figure 3A:
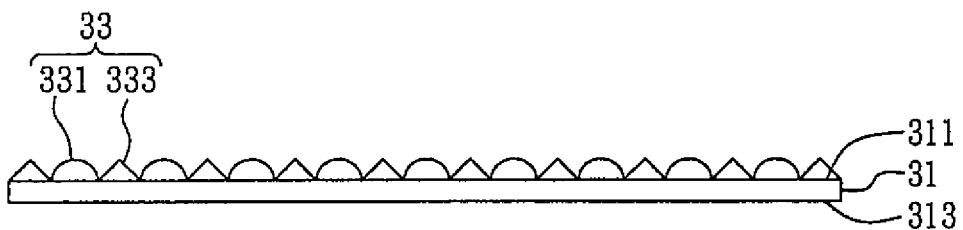
FIG. 3(a) and FIG. 3(b) are the lateral view and top view of a conventional light-adjusting element.
Figure 3B:
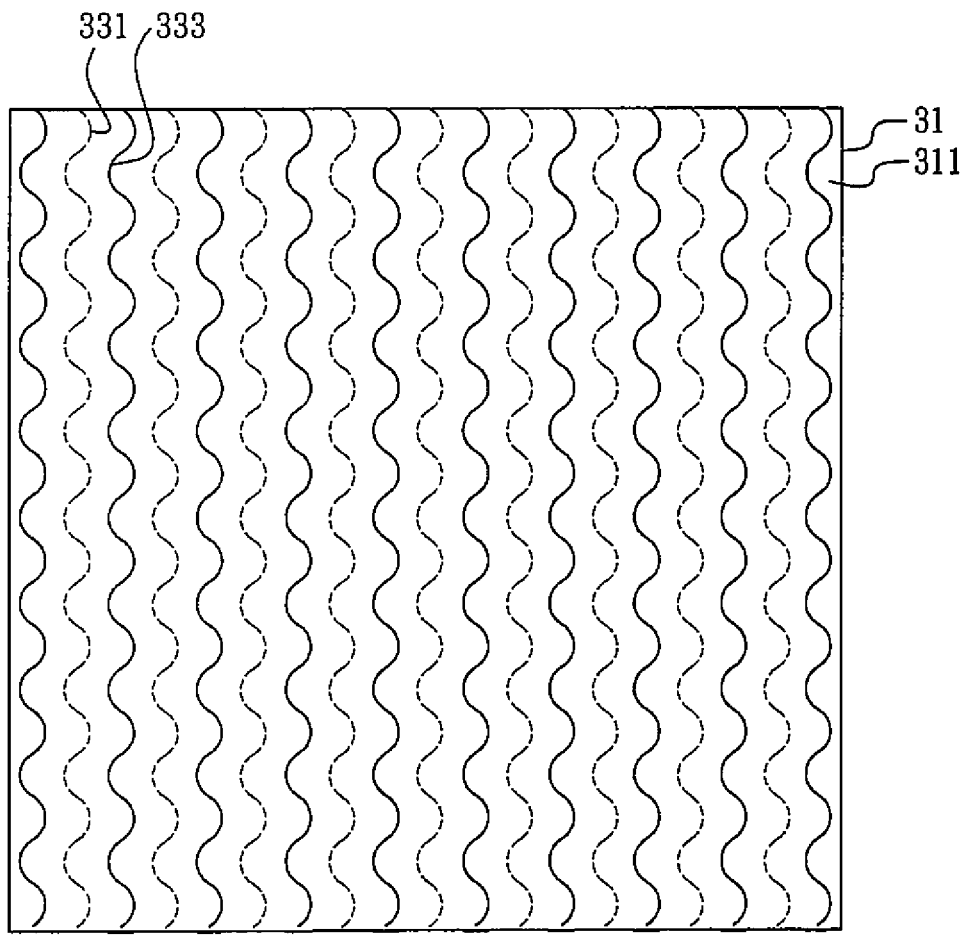
Figure 4A:
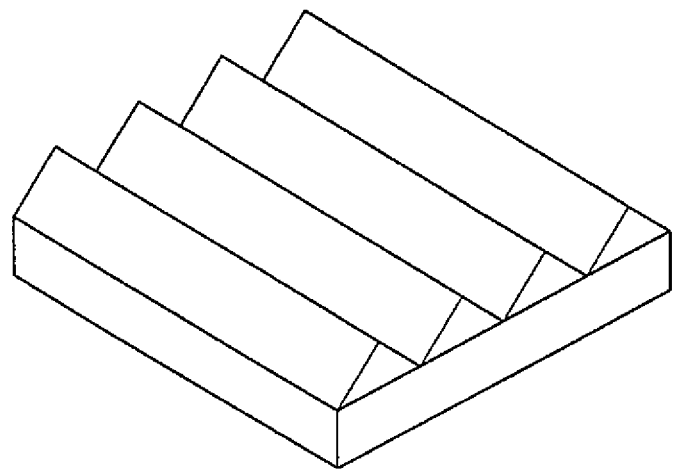
FIG. 4(a) to FIG. 4(d) are schematic views of one embodiment of the first light-adjusting structure according to the present invention.
Figure 4B:
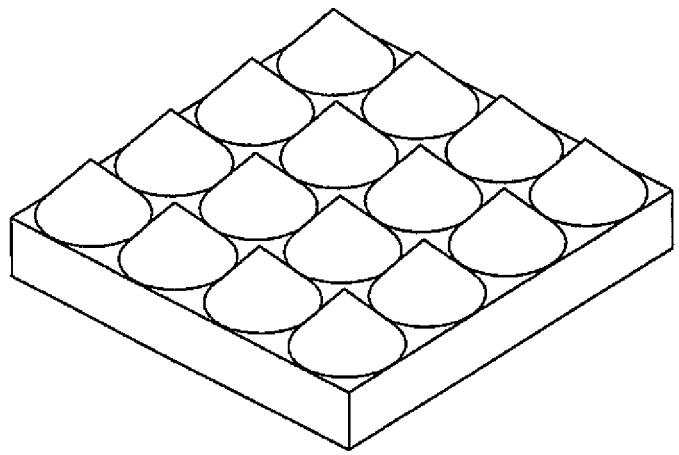
Figure 4C:
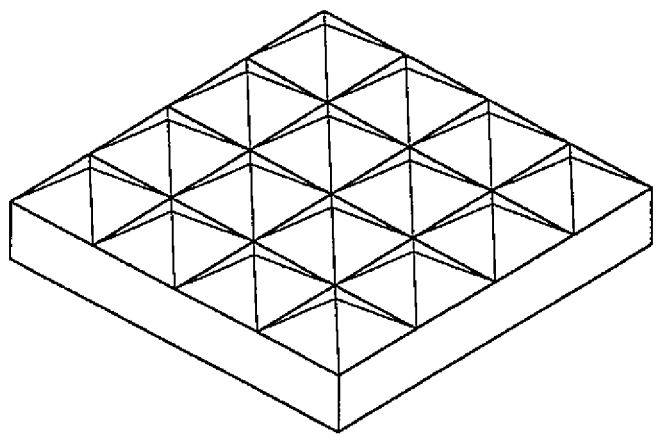
Figure 4D:
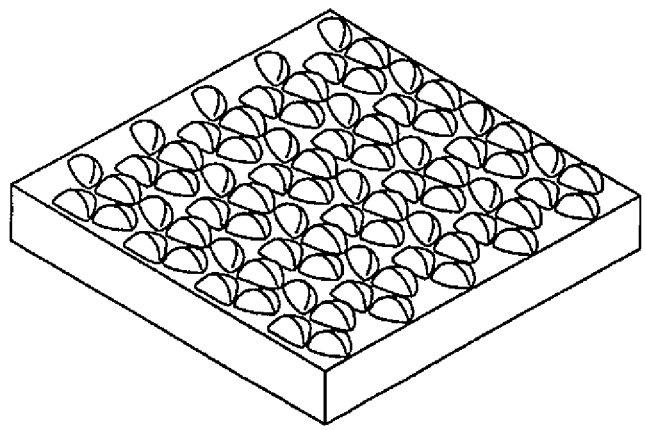

The substrate for the optical film of the present invention can be any of the substrates known to persons of ordinary skill in the art, such as glass or plastic substrate. The plastic substrate is not particularly limited, and includes, but is not limited to, a polyester resin, such as polyethylene terephthalate (PET); a polyacrylate resin, such as polymethyl methacrylate (PMMA); a polyolefin resin, such as polyethylene (PE) or polypropylene (PP); a polycycloolefin resin; a polyimide resin; a polycarbonate resin; a polyurethane resin; tri-acetate cellulose (TAC); or a mixture thereof, among which the polyester resin and polyacrylate resin are the preferred ones. The thickness of the substrate usually depends on the requirement of the desired optical product, and is preferably between about 50 μm (micron) to about 300 μm.

The substrate of the present invention has a first optical surface and a second optical surface, where the first optical surface has a microstructure layer thereon. According to the present invention, the microstructure layer can be formed from any resin that has a refractive index higher than that of air. In general, the higher the refractive index is, the better the effect will be. The optical film of the present invention has a refractive index of at least 1.50, preferably in the range from 1.50 to 1.7. The resin suitable for forming the microstructure layer is well known to persons having ordinary skill in the art, which can be, for example, thermal setting resins or UV curable resins, of which the UV curable resins are preferred. The monomers for the UV curable resins include, but are not limited to, acrylate monomers. The acrylate monomers that can be used in the present invention include, for example, but are not limited to, acrylates, methacryaltes, urethane acrylates, polyester acrylates, epoxy acrylates, or a mixture thereof, among which acrylates or methacrylates are preferred. The above-mentioned acrylate monomers may contain one or more functional groups, preferably more functional groups.

Examples of the acrylate monomers suitable for the present invention include are, for example, selected from the group consisting of (meth)acrylate, tripropylene glycol di(meth)acrylate, 1,4-butanediol di(meth)acrylate, 1,6-hexanediol di(meth)acrylate, polyethyleneglycol di(meth)acrylate, allylated cyclohexyl di(meth)acrylate, isocyanurate di(meth)acrylate, 2-phenoxyl ethyl(meth)acrylate, ethoxylated trimethylol propane tri(meth)acrylate, propoxylated glycerol tri(meth)acrylate, trimethylol propane tri(meth)acrylate, and cumyl phenoxyl ethyl acrylate (CPEA), and a mixture thereof.

The examples of the commercially available acrylate monomers include, for example, those with the trade names SR454®, SR494®, SR9020®, SR9021®, and SR9041®, produced by Sartomer Company; those with the trade names 624-100®, EM210®, and EM2108®, produced by Eternal Company; and those with the trade names Ebecryl 600®, Ebecryl 830®, Ebecryl 3605®, and Ebecryl 6700®, produced by UCB Company.

In the above-mentioned resin for forming the microstructure layer, any conventional additive, for example, a photoinitiator, a crosslinking agent, inorganic particulates, a leveling agent, an antifoaming agent, or an antistatic agent can be optionally added. Suitable species of the additives are well known to persons having ordinary skill in the art.

The anti-static agents useful in the present invention are well known to persons of ordinary skill in the art, which include, for example, but are not limited to ethoxy glycerin fatty acid esters, quaternary amine compounds, aliphatic amine derivatives, epoxy resins (such as polyethylene oxide), siloxane, or other alcohol derivatives, such as poly(ethylene glycol) ester, poly(ethylene glycol) ether and the like. The optional addition of an anti-static agent to the resin for forming the microstructure layer can impart an anti-static effect to the optical film produced and enhance the yields.

The photoinitiators useful for the invention are those that generate free radicals upon photoirradiation to induce polymerization through the transfer of free radicals. The photoinitiators useful in the invention are well known to persons having ordinary skill in the art, which include, for example, but are not limited to, benzophenone, benzoin, 2-hydroxy-2-methyl-1-phenylpropan-1-one, 2,2-dimethoxy-1,2-diphenylethan-1-one, 1-hydroxy cyclohexyl phenyl ketone, and 2,4,6-trimethylbenzoyl diphenyl phosphine oxide, and a mixture thereof. Preferably, the photoinitiator is benzophenone or 1-hydroxy cyclohexyl phenyl ketone.

In order to enhance the hardness of the microstructures, inorganic particulates can be optionally added to the resin. The inorganic particulates suitable for the present invention are well known to persons having ordinary skill in the art, which include, for example, but are not limited to zinc oxide, silicon dioxide, strontium titanate, zirconia, alumina, titanium dioxide, calcium sulphate, barium sulfate, or calcium carbonate, or a mixture thereof, of which titanium dioxide, silicon dioxide, or zinc oxide, or a mixture thereof is preferred. The particle size of the above-mentioned inorganic particulates is in the range from about 0.01 micrometers to about 100 micrometers.

Optionally, a proper amount of diffusion particles can be added to the resin for forming the microstructure layer of the present invention, so as to further enhance the optical diffusion effect. The diffusion particles suitable for the microstructure layer according to the present invention are not particularly limited and are well known to persons having ordinary skill in the art, which can be organic particles, such as particles of an acrylate resin, a methacrylate resin, a styrene resin, a urethane resin, or a silicone resin, or a mixture thereof, of which the acrylate resin, silicone resin, and a mixture thereof are preferred. Alternatively, the diffusion particles can be inorganic particles, such as zinc oxide, silicon dioxide, titanium dioxide, zirconia, alumina, zinc sulfide, or barium sulfate, or a mixture thereof. The diffusion particles can be a combination of the organic and inorganic particles. Preferably, the diffusion particles are the organic particles. The shape of the diffusion particles is not particularly limited, and can be, for example, spherical or diamond-shaped. The particle size of the diffusion particles is preferably in the range from about 1 μm to about 30 μm. According to the present invention, the amount of the above-mentioned diffusion particles is preferably in the range of from about 0.1 parts by weight to about 10 parts by weight per 100 parts by weight of the solids content of the resin for forming the microstructure layer.

Figure 5A:
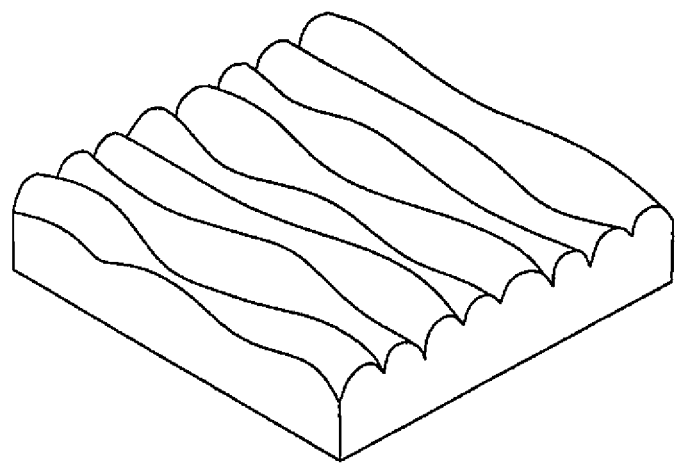
FIG. 5(a) to FIG. 5(c) are schematic views of one embodiment of the second light-adjusting structure according to the present invention.
Figure 5B:
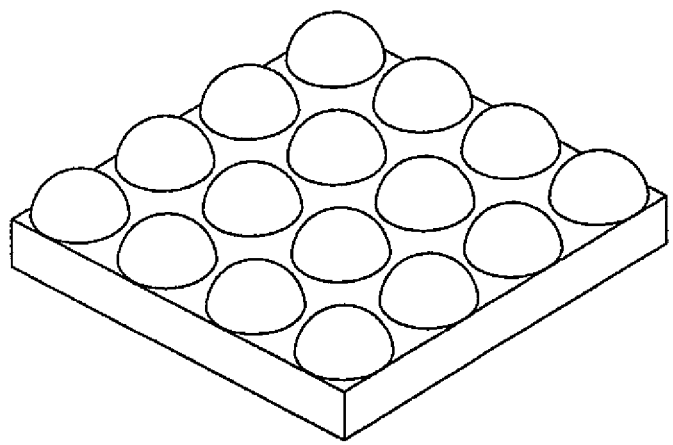
Figure 5C:
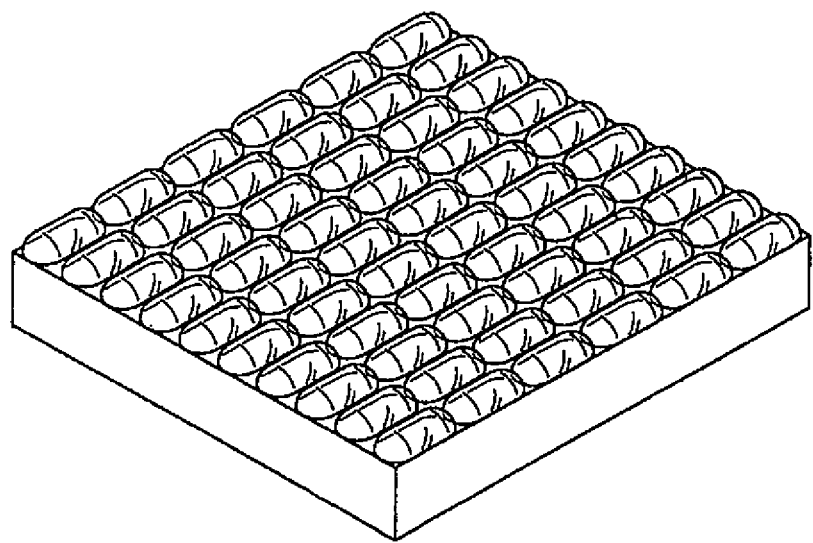

The microstructure layer of the invention comprises a plurality of first light-adjusting structures selected from the group consisting of prism columnar structures, conical columnar structures, solid angle structures, and orange-segment like structures and a combination thereof and a plurality of second light-adjusting structures selected from the group consisting of arc columnar structures, lens-like structures, and capsule-like structures and a combination thereof, wherein at least a portion of the second light-adjusting structures has a height greater than those of all the first light-adjusting structures. FIG. 4 represents schematic views of the first light-adjusting structure of the present invention, in which FIGS. 4(a), 4(b), 4(c), and 4(d) respectively show the prism columnar structures, conical columnar structures, solid angle structures, and orange-segment like structures. FIG. 5 represents schematic views of the second light-adjusting structure of the present invention, in which FIG. 5(a) to 5(c) respectively show the arc columnar structures, lens-like structures, and capsule-like structures. Since the first light-adjusting structures according to the present invention have a smaller apex curvature radium, they have a better brightness enhancing property. However, the apex angles of the first light-adjusting structures are easy to be damaged by contacts or bumps. As for the second light-adjusting structures according to the present invention, they have a larger apex curvature radium, and have a better light diffusion property. Therefore, by the feature that at least a portion of the second light-adjusting structures has a height greater than those of all the first light-adjusting structures, the optical film according to the present invention will have a lower probability that the first light-adjusting structures contact other films or substrates, and will have a better abrasion resistance. The optical film of the present invention can achieve the effects of gathering and homogenizing light by using first light-adjusting structures having a better light-gathering effect and obviate the necessity of using protective films.

The term "at least a portion of the second light-adjusting structures" represents at least two or more second light-adjusting structures, preferably 20% to 100% second light-adjusting structures, more preferably from 40% to 60% second light-adjusting structures. However, in view of the demands for a practical application and the demands for optical properties, the amount of the second light-adjusting structures can be adjusted. Any suitable amount of the second light-adjusting structures can be used to avoid the direct contacts between the first light-adjusting structures and other films or panels. The embodiments of the optical films of the invention will be further described by referring to the attached drawings.

Figure 6A:
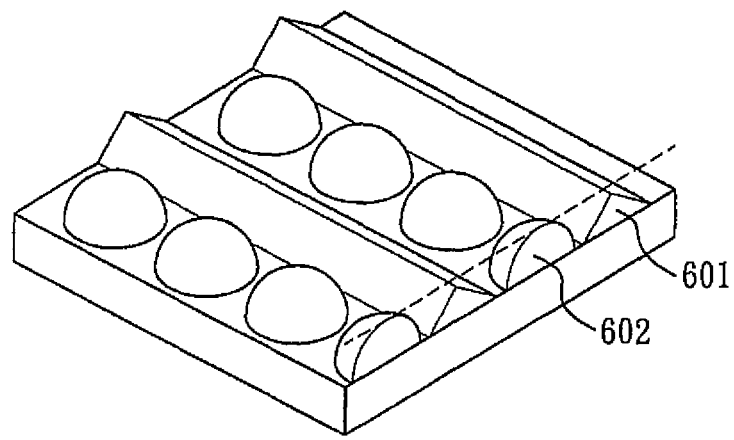
FIG. 6(a) is a schematic view of a preferred embodiment of the optical film according to the present invention.

FIG. 6(a) is a schematic view of a preferred embodiment of the optical film according to the present invention, in which the first light-adjusting structure is a prism columnar structure 601 and the second light-adjusting structure is a lens-like structure 602. Preferably, the lens-like structures are semicircular lenses, and the heights of the lenses (i.e., the radii) can be the same or different, and preferably the same, and are in the range from 2 μm to 30 μm. In a preferred embodiment of FIG. 6(a), since at least a portion of the lens-like structures has a height greater than those of the prism columnar structures, the peak angles of the prism columnar structures will not contact other films or panels and will not be damaged. Therefore, the abrasion resistance of the optical film can be enhanced. Moreover, since in this preferred embodiment, prism columnar structures are used, the light can be homogenized and the moiré phenomenon can be alleviated. In addition, since prism columnar structures are used, the optical film can achieve a light-gathering effect.

Figure 6B:
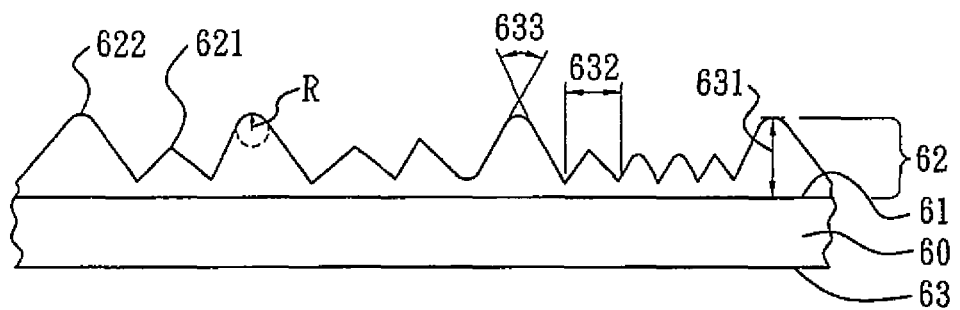
FIG. 6(b) is a schematic view of another preferred embodiment of the optical film according to the present invention.

FIG. 6(b) is a schematic view of another preferred embodiment of the optical film according to the present invention. As shown in FIG. 6(b), the inventive optical film comprises a substrate 60 and a microstructure layer 62; the substrate 60 has a first optical surface 61 and second optical surface 63; and the microstructure layer 62 comprises a plurality of prism columnar structures 621 as the first light-adjusting structures and a plurality of arc columnar structures 622 as the second light-adjusting structures, wherein at least a portion of the arc columnar structures 622 has a height greater than those of the prism columnar structures 621. Owing to the difference in heights of the arc columnar structures 622 and prism columnar structures 621, the peak angles of the prism columnar structures 621 will not contact other films or panels and will not be damaged. Therefore, the abrasion resistance of the optical film can be enhanced. Moreover, since light-gathering effect of the prism columnar structures 621 is superior to that of the arc columnar structures 622, the optical film not only is abrasion resistant but achieves the light-gathering effect.

Figure 7A:
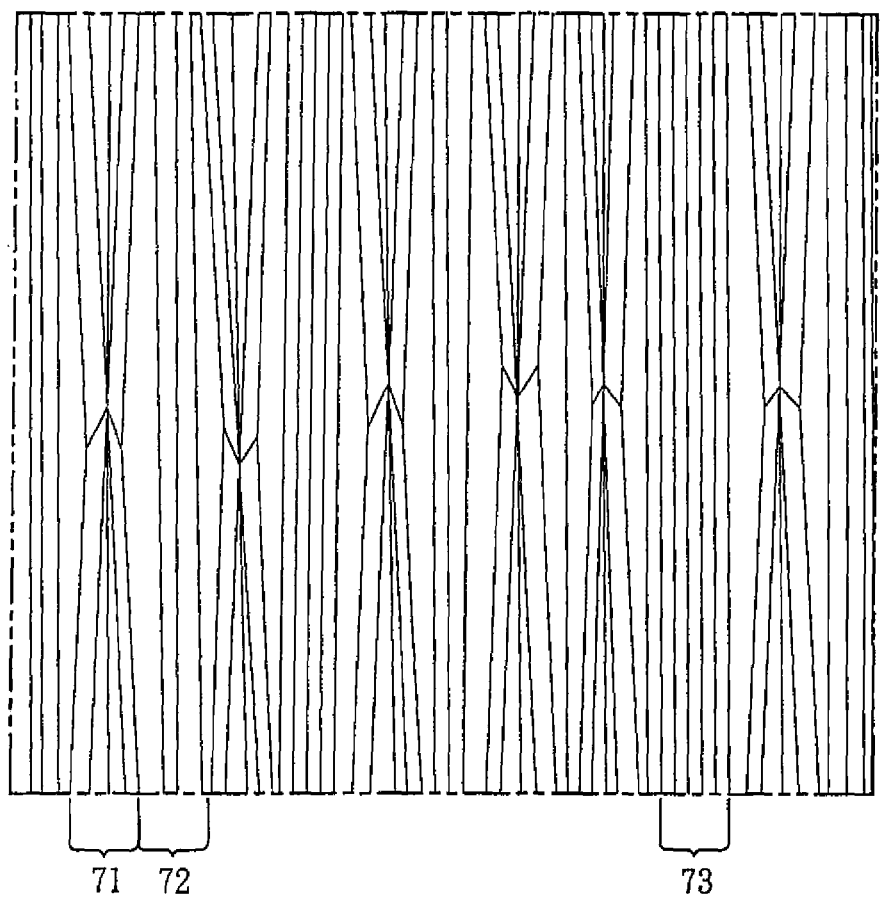
FIG. 7(*a*) is a schematic view (top view) of a microstructure layer having non-parallel prism columnar structures.

When the first light-adjusting structures comprise prism columnar structures and/or the second light-adjusting structures comprise arc columnar structures, at least two or more of the columnar structures can be non-parallel to each other, thereby reducing the optical interference. The above-mentioned non-parallel columnar structures can be non-parallel prism columnar structures, non-parallel arc columnar structures, non-parallel prism columnar structures and arc columnar structure, or a combination thereof. The above-mentioned non-parallel columnar structures can be in a crossed or non-crossed form in the microstructure layer. FIG. 7(a) is a schematic view (top view) of a microstructure layer having non-parallel prism columnar structures. As shown in FIG. 7(a), the microstructure layer of the inventive optical film comprises non-parallel columnar structures (e.g., crossed non-parallel columnar structures 71, or non-crossed non-parallel columnar structures 72) and parallel columnar structures 73.

Figure 7B:
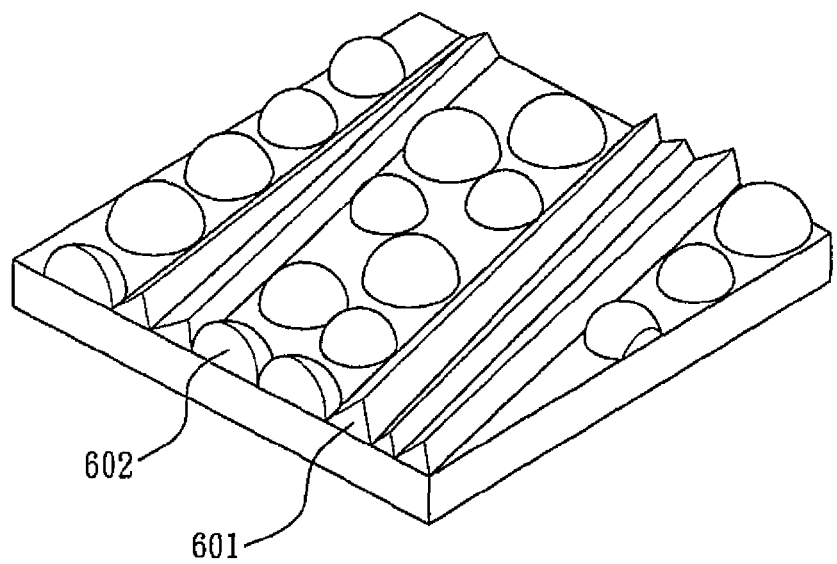

FIG. 7(b) shows a further embodiment of the optical film of FIG. 6(a). In this embodiment, the first light-adjusting structures are prism columnar structures 601 and the second light-adjusting structures are lens-like structures 602, wherein at least a portion of the lens-like structures has a height greater than those of the prism columnar structures, and wherein at least two or more of the prism columnar structures are non-parallel to each other. In this embodiment, since the microstructure layer comprises non-parallel prism columnar structures, the optical interference can be further reduced.

According to another preferred embodiment of the present invention, the inventive optical film comprises a substrate having a first optical surface and a second surface and a microstructure layer on the first optical surface of the substrate, wherein the microstructure layer comprises a plurality of prism columnar structures as the first light-adjusting structures and a plurality of arc columnar structures as the second light-adjusting structures, wherein at least a portion of the arc columnar structures has a height greater than those of all the prism columnar structures, and wherein at least two or more of the first light-adjusting structures and the second light-adjusting structures are non-parallel to each other. According to this preferred embodiment, the inventive optical film can avoid the damage caused by the contacts between the microstructure layer and other optical films or panels and provide a better light-gathering effect. Moreover, since the microstructure layer contain non-parallel light-adjusting structures, the optical interference can be further reduced.

In the following, the first and second light-adjusting structures of the invention will be further described in terms of various geometric properties, such as the height, width, apex angle, and curvature radius, by referring to FIG. 6(*b*). However, it should be noted that the definitions of the height, width, apex angle, and curvature radius are suitable for any of the first and second light-adjusting structures and the improvements thereof and are not used only for the prism columnar structures and arc columnar structures shown in FIG. 6(*b*). It should be further noted that not all of the curvature radii and apex angles of the first and second light-adjusting structures can be determined. For example, it is not easy to define and determine the curvature radius and apex angle of an orange-segment like structure.

Figure 8:
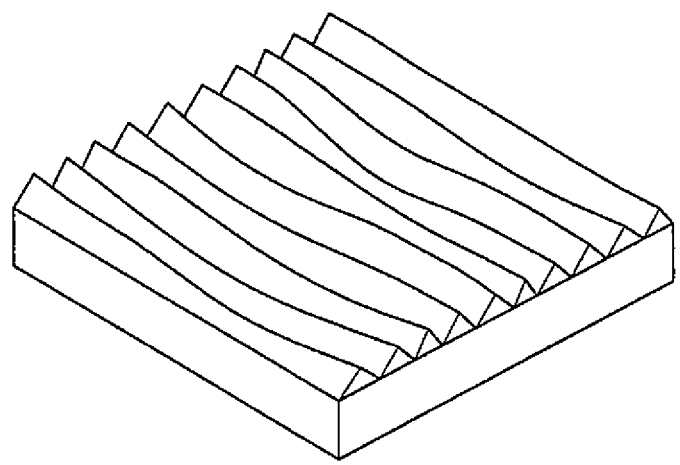
FIG. 8 is a schematic view of one embodiment of the light-adjusting structure according to the present invention.

According to the present invention, the height of a light-adjusting structure is defined as the distance between the top of the light-adjusting structure and the first optical surface of the substrate (see FIG. 6(*b*), the reference numeral 631). Except for the limitation that at least a portion of the second light-adjusting structures has a height greater than those of all the first light-adjusting structures, the heights of the first and second light-adjusting structures are not particularly limited. The heights of the first and second light-adjusting structures can be the same or different from each other and are in the range from 5 µm to 100 µm, preferably from 10 µm to 50 µm, more preferably from 20 µm to 40 µm. If the first light-adjusting structures are prism columnar structures and/or the second light-adjusting structures are arc columnar structures, a columnar structure with different heights at different positions along the length direction can be optionally used so as to reduce optical interference. FIG. 8 is a schematic view of a microstructure layer comprising prism columnar structures that have different heights at different positions along the length direction. Preferably, in a columnar structure with a nominal height (or an average height), at least a portion of the structures changed in height randomly along the length direction. The changing magnitude in height is at least 5% of the nominal height, preferably in the range from 5% to 50% of the nominal height.

According to the present invention, the width of a light-adjusting structure refers to the distance between two adjacent pits (see FIG. 6(*b*), the reference numeral 632). The widths of the first and second light-adjusting structures of the invention are not particularly limited and can be those well known to persons having ordinary skill in the art. The widths of the first light-adjusting structures or second light-adjusting structures can be the same or different, and are in the range from 1 µm to 100 µm. Preferred widths will vary with the pixel intervals of liquid crystal displays, and are those selected so as to reduce the moiré interference. In addition, if the first light-adjusting structures are prism columnar structures and/or the second light-adjusting structures are arc columnar structures, a same columnar structure can have different widths at different positions along the length direction, and when said columnar structure is crossed with another columnar structure, said columnar structure has a width of 0 µm at the cross point.

According to the present invention, the apex curvature radius of the first light-adjusting structure (not shown in FIG. 6(*b*)) is less than 2 µm. The apex curvature radii of the first light-adjusting structures can be the same or different. According to the present invention, the apex curvature radius of the second light-adjusting structure (see FIG. 6(*b*), reference symbol R) is between 2 µm and 50 µm, preferably between 5 µm and 35 µm, more preferably between 10 µm and 25 µm. The apex curvature radii of the second light-adjusting structures can be the same or different.

According to the present invention, the apex angles of the light-adjusting structures (see FIG. 6(*b*), reference numeral 633) can be the same or different, and are between 40° and 120°, preferably between 85° and 95°.

With the technical concept according to the present invention, any optical films obtained by modifying the first light-adjusting structures or the second light-adjusting structures fall within the reasonable protection scope of the invention. For example, the columnar structure can be further processed so as to have prism columnar, arc columnar, conical, solid angle, lens-like, and capsule-like microstructure. In the present invention, the arrangement of the first light-adjusting structures and the second light-adjusting structures can be altered so that the structures are regularly arranged or randomly arranged (such as a microstructure layer obtained by regularly and periodically arranging several prism columnar structures in combination with several arc columnar structures). Moreover, the columnar structures of the microstructure layer according to the present invention can be linear, zigzag, or serpentine.

To avoid being scratched and adversely affecting the optical properties, a scratch-resistant layer is preferably formed on the second optical surface (i.e., the light incidence surface) of the substrate of the inventive optical film. The scratch-resistant layer can be smooth or non-smooth. The method for forming the scratch-resistant layer is not particularly limited, and can be any method that is well known to persons skilled in the art, which includes, for example, but is not limited to, screen printing, spray coating, or embossing processing, or forming a coating on the substrate surface. The thickness of the scratch-resistant layer is preferably in the range from 1 to 50 µm, more preferably from 1 to 10 µm.

The resins suitable for forming the scratch-resistant layer of the invention are not particularly limited and are well known to persons having ordinary skill in the art, which can be a UV curable resin, a thermal setting resin or a thermal plastic resin, or a mixture thereof. The resin can be treated in a manner of thermo-curing, UV-curing, or a dual curing with both heat and UV radiation, so as to form the scratch-resistant layer of the invention.

According to one embodiment of the invention, the resin used contains a UV curable resin and a resin selected from the group consisting of a thermal setting resin, a thermal plastic resin, and a mixture thereof, which is treated by a dual curing manner so as to form a scratch-resistant layer that has an excellent heat resistance and extremely low volume shrinkage.

The UV curable resin useful in the present invention comprises at least one acrylic monomer or acrylate monomer having one or more functional groups, of which the acrylate monomer is preferred. The acrylate monomer suitable for the present invention includes, but is not limited to, a methacrylate monomer, an acrylate monomer, a urethane acrylate monomer, a polyester acrylate monomer, or an epoxy acrylate monomer, of which the acrylate monomer is preferred.

For example, the acrylate monomer suitable for the UV curing resin used in the present invention is selected from the group consisting of methyl methacrylate, butyl acrylate, 2-phenoxy ethyl acrylate, ethoxylated 2-phenoxy ethyl acrylate, 2-(2-ethoxyethoxy)ethyl acrylate, cyclic trimethylolpropane formal acrylate, β-carboxyethyl acrylate, lauryl methacrylate, isooctyl acrylate, stearyl methacrylate, isodecyl acrylate, isobornyl methacrylate, benzyl acrylate, hydroxypivalyl hydroxypivalate diacrylate, ethoxylated 1,6-hexanediol diacrylate, dipropylene glycol diacrylate, tricyclodecane dimethanol diacrylate, ethoxylated dipropylene glycol diacrylate, neopentyl glycol diacrylate, propoxylated neopentyl glycol diacrylate, ethoxylated bisphenol-A dimethacrylate, 2-methyl-1,3-propanediol diacrylate, ethoxylated 2-methyl-1,3-propanediol diacrylate, 2-butyl-2-ethyl-1,3-propanediol diacrylate, ethylene glycol dimethacrylate, diethylene glycol dimethacrylate, 2-hydroxyethyl methacrylate phosphate, tris(2-hydroxy ethyl)isocyanurate triacrylate, pentaerythritol triacrylate, ethoxylated trimethylolpropane triacrylate, propoxylated trimethylolpropane triacrylate, trimethylolpropane trimethacrylate, pentaerythritol tetraacrylate, ethoxylated pentaerythritol tetraacrylate, ditrimethylolpropane tetraacrylate, propoxylated pentaerythritol tetraacrylate, dipentaerythritol hexaacrylate, hydroxyethyl acrylate (HEA), 2-hydroxyethyl methacrylate (HEMA), tripropylene glycol dimethacrylate, 1,4-butanediol dimethacrylate, 1,6-hexanediol dimethacrylate, allylated cyclohexyl dimethacrylate, isocyanurate dimethacrylate, ethoxylated trimethylol propane trimethacrylate, propoxylated glycerol trimethacrylate, trimethylol propane trimethacrylate, and tris(acryloxyethyl)isocyanurate, and a mixture thereof. Preferably, the acrylate monomers contain dipentaerythritol hexaacrylate, trimethylolpropane triacrylate, and pentaerythritol triacrylate.

The UV curable resin used in the present invention can optionally contain an oligomer having a molecular weight in a range from $10^3$ to $10^4$. Such oligomers are well known to persons having ordinary skill in the art, such as, acrylate oligomers, which include, for example, but are not limited to, urethane acrylates, such as aliphatic urethane acrylates, aliphatic urethane hexaacrylates, and aromatic urethane hexaacrylates; epoxy acrylates, such as bisphenol-A epoxy diacrylate and novolac epoxy acrylate; polyester acrylates, such as polyester diacrylate; or homo-acrylates.

The thermal setting resin suitable for the present invention typically has an average molecular weight in a range from $10^4$ to $2\times10^6$, preferably from $2\times10^4$ to $3\times10^5$, and more preferably from $4\times10^4$ to $10^5$. The thermal setting resin of the present invention can be selected from the group consisting of a carboxyl (—COOH) and/or hydroxyl (—OH) group-containing polyester resin, epoxy resin, polyacrylate resin, polymethacrylate resin, polyamide resin, fluoro resin, polyimide resin, polyurethane resin, and alkyd resin, and a mixture thereof, of which the polymethacrylate resin or polyacrylate resin containing a carboxy (—COOH) and/or hydroxyl (—OH) group is preferred, such as a polymethacrylic polyol resin.

The thermal plastic resin that can be used in the present invention is selected from the group consisting of polyester resins; polymethacrylate resins, such as polymethyl methacrylate (PMMA); and a mixture thereof.

To improve light diffusion effect, an appropriate amount of diffusion particles can be optionally added to the resin. The diffusion particles are as those defined hereinbefore, and the particle size thereof is preferably in the range from about 1 μm to about 15 μm. The amount of the above-mentioned diffusion particles is in the range of from about 0.1 parts by weight to about 10 parts by weight per 100 parts by weight of the solids content of the resin for forming the scratch-resistant layer.

Figure 9:
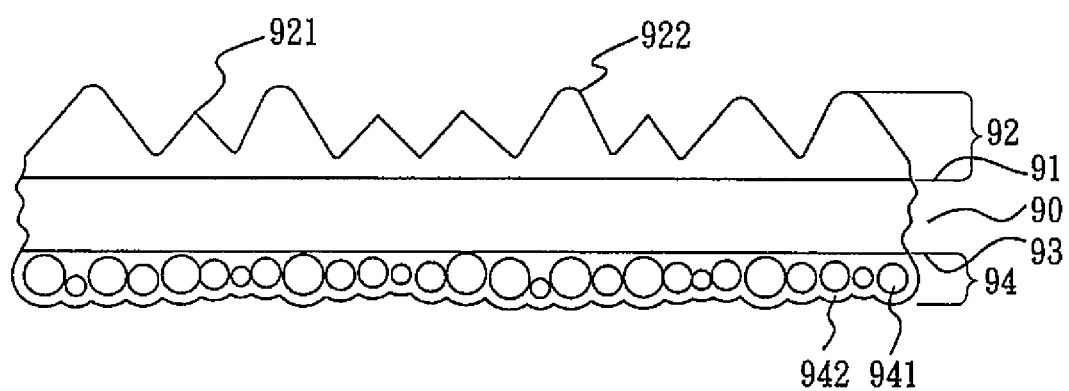
FIG. 9 is a schematic view of another embodiment of the optical film according to the present invention.

FIG. 9 is a schematic view of one embodiment of the inventive optical film. As shown in FIG. 9, the inventive optical film comprises a substrate 90, a microstructure layer 92, and a scratch-resistant layer 94, where the substrate 90 has a first optical surface 91 and a second optical surface 93. The first optical surface of the substrate 90 is provided with the microstructure layer 92, said microstructure layer 92 comprising a prism columnar structure 921 and an arc columnar structure 922. The second optical surface of the substrate is provided with the scratch-resistant layer 94, said scratch-resistant layer 94 being formed from a resin 942 that contains diffusion particles 941.

According to the present invention, the scratch-resistant layer can optionally include a conventional additive that is known to persons having ordinary skill in the art. The additives include, for example, but are not limited to an anti-static agent, a photoinitiator, a leveling agent, a wetting agent, a dispersant, and inorganic particulates. The species of the anti-static agent, photoinitiator, and inorganic particulates suitable for the present invention are as those defined hereinbefore.

The microstructure layer of the inventive optical film can be fabricated by any conventional method which is known to persons of ordinary skill in the art. For example, it may be produced by the method comprising the following steps:
(a) mixing the resin with an appropriate additive to form a colloidal coating composition;
(b) moving a diamond tool on a rotating cylindrical roll (referred to as the "roller") in a direction transverse to the roller, and carving specific grooves on the roller with the diamond tool by controlling the movement speed of the diamond tool and/or the rotation speed of the roller;
(c) applying the colloidal coating composition onto a substrate, and then performing a roller embossing, thermo-transfer printing, or thermo-extruding on the carved roller obtained from step (b) so as to form a structured surface layer; and
(d) irradiating and/or heating the coating layer to cure the coating layer.

Preferably, in Step (b), the movement speed of the diamond tool can be controlled by electrical signals, for example, by a fixed frequency or random frequencies. When the random frequencies were used, Step (b) was repeated to acquire multiple non-parallel grooves, and to also produce crossed grooves. Preferably, the curing step of Step (d) was performed by irradiation to cause photo polymerization. The irradiation was performed with a light source in a certain wavelength range, which can be, for example, UV light, infrared light, visible light, or heat rays (nucleus rays or radiation rays), and preferably UV light. The intensity of the irradiation was in a range from 1 to 500 $mJ/cm^2$, preferably from 50 to 300 $mJ/cm^2$.

The scratch-resistant layer of the inventive optical film can be fabricated by any conventional method which is known to persons of ordinary skill in the art. For example, it may be produced by applying a coating composition comprising particles, a resin, and optional an additive to a substrate to form a coating layer on the substrate, and irradiating and/or heating the coating layer so as to cure the coating layer.

The microstructure layer and scratch-resistant layer of the optical film according to the invention have a surface resistivity of less than $10^{13} \Omega/\square$, preferably in the range from $10^8$ to $10^{12} \Omega/\square$, and have a haze of from 5% to 70%, as measured according to JIS K7136 standard method.

The following examples are used to further illustrate the present invention, but not intended to limit the scope of the present invention. Any modifications or alterations that can easily be accomplished by persons skilled in the art fall within the scope of the disclosure of the specification and the appended claims.

PREPARATION EXAMPLE 1

Preparation of Resin Formulation A

In a 250 mL glass bottle, a solvent of 40 g toluene was added. With high speed stirring, the following substances were added in sequence: 10 g dipentaerythritol hexaacrylate, 2 g trimethylol propane trimethacrylate, 14 g pentaerythritol triacrylate, an oligomer: 28 g of an aliphatic urethane hexaacrylate [Etercure 6415-100, Eternal Co.], and a photoinitiator: 6 g 1-hydroxy cyclohexyl phenyl ketone to provide 100 g of Resin Formulation A with a solids content of about 60%.

PREPARATION EXAMPLE 2

Engraving of Roller

The surface of a fine roller was electroplated with electroless nickel or oxygen-free copper, and processed with a CNC precision lathe and single-crystal diamond cutter under a lathe speed of less than 500 rpm and a largest feed amount of 0.015 mm according to a number control (NC) program written according to a pre-determined pattern so as to result in the desired concave microstructure for the subsequent processing.

EXAMPLE 1

Preparation of Microstructure Layer 60 g EM210® (2-phenoxyethylacrylate, sold by Eternal Company) and 60 g 624-100® (epoxy acrylate, sold by Eternal Company) were mixed, and then 5 g Chivacure® BP was added as photoinitiator (benzophenone, provided by Double Bond Chemical), and the mixture was stirred at 1000 rpm at 50° C. to form a colloidal coating composition.

Figure 10:
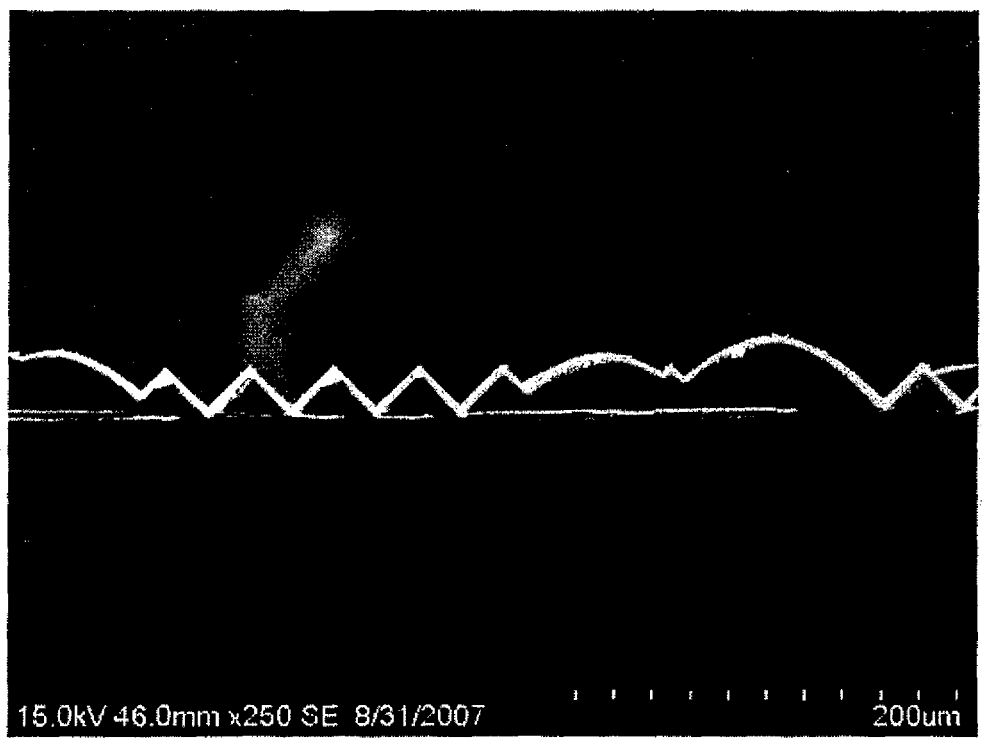
FIG. 10 represents a scanning electron microscope (SEM) photograph of the microstructure layer of the optical film of Example 1.

The colloidal coating composition was coated onto a PET substrate (U34®, produced by TORAY Company) to form a coating layer, and then a structured surface was formed on the coating layer by embossing with the roller having a concave microstructure prepared in Preparation Example 2. Thereafter, the coating layer was cured by irradiation with energetic radiation (200 to 400 nm UV lamp; intensity: 150 to 300 mJ/cm$^2$; time: 2 to 15 seconds) at normal temperature. FIG. 10 represents a SEM photograph of the microstructure layer of the optical film of Example 1.

As described hereinbefore, a scratch-resistant layer can be formed on the other surface opposite to the microstructure layer of the substrate. The order of preparing the microstructure layer and the scratch-resistant layer is not particularly limited. The preparation of the scratch-resistant layer is described in the following:

Preparation of Scratch-Resistant Layer

To a 250 ml glass bottle, 27 g toluene and 13.5 g butanone were added as a solvent. With high speed stirring, the following substances were added in sequence: 0.5 g acrylic particles with an average particle size of 8 μm [SSX-108, SEKISUI PLASTICS Co.]; 40 g of Resin Formulation A prepared in Preparation Example 1; a thermal setting resin: 20 g of an acrylate resin [Eterac 7365-S-30, Eternal Company] (with a solids content of about 30%); and 2 g of an anti-static agent [GMB-36M-AS, Marubishi Oil Chem. Co., Ltd] (with a solids content of about 20%) to prepare a coating material with a total weight of about 100 g and solids content of about 30%. The coating material was coated on a PET substrate having a thickness of 188 μm [U34, TORAY Co.] with a RDS Bar Coater #3, dried at 100° C. for 1 minute, then dried by exposure to a UV exposure machine [Fusion UV, F600V, 600 W/inch, H type lamp source] at a power set at 100% and at a speed of 15 m/min with an energetic ray of 200 mJ/cm2, to afford a scratch-resistant layer with a coating thickness of about 5 μm.

EXAMPLE 2

Preparation of Microstructure Layer 5 g acrylic particulates with an average particle size of 5 μm [SSX-105, SEKISUI PLASTICS Co.] and 45 g EM2108® [cumyl phenoxyl ethyl acrylate, CPEA, sold by Eternal Company] were mixed homogeneously. 20 g of the resultant mixture, 60 g EM210® (2-phenoxy ethyl acrylate, sold by Eternal Company), and 60 g 624-100® (epoxy acrylate, sold by Eternal Company) were mixed, and then 5 g Chivacure® BP (benzophenone, provided by Double Bond Chemical) was added as photo initiator, and the mixture was stirred at 1000 rpm at 50° C. to form a colloidal coating composition.

Figure 11:
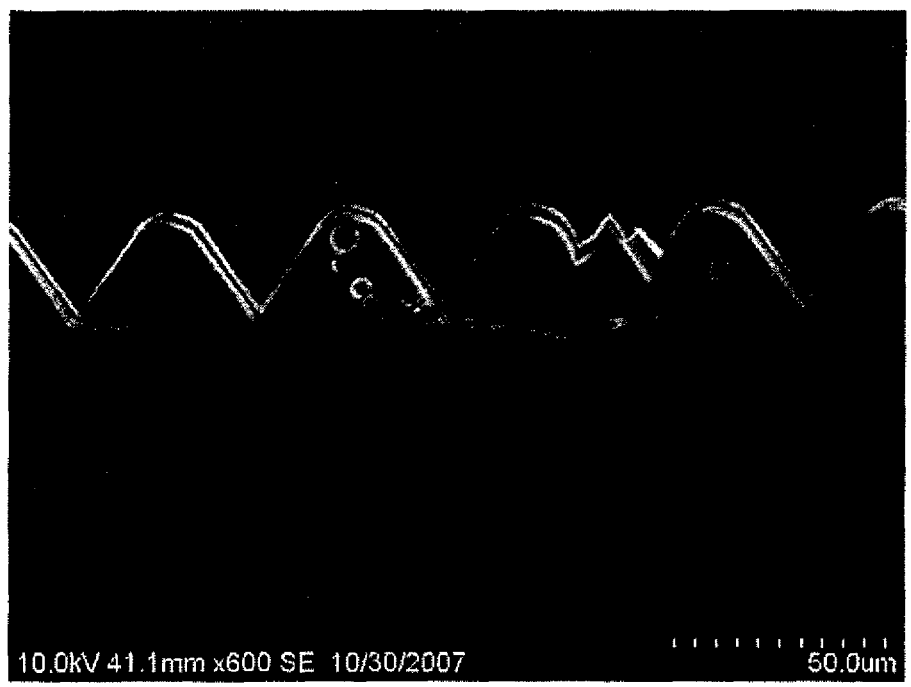
FIG. 11 represents a SEM photograph of the microstructure layer of the optical film of Example 2.

The colloidal coating composition was coated onto a PET substrate (U34®, produced by TORAY Company) to form a coating layer, and then a structured surface was formed on the coating layer by embossing with the roller having a concave microstructure prepared in Preparation Example 2. Thereafter, the coating layer was cured by irradiation with energetic radiation (200 to 400 nm UV lamp; intensity: 150 to 300 mJ/cm$^2$; time: 2 to 15 seconds) at normal temperature. FIG. 11 represents a SEM photograph of the microstructure layer of the optical film of Example 2.

Preparation of Scratch-Resistant Layer

A scratch-resistant layer was formed on the other side of the substrate in accordance with the method described in Example 1.

COMPARATIVE EXAMPLE 1

A commercially available brightness enhancement film, BEFIII-M (3M Company), which has a prism columnar microstructure.

COMPARATIVE EXAMPLE 2

A commercially available brightness enhancement film, MP2-65 (GAMMA OPTICAL Company), which has a prism columnar microstructure.

COMPARATIVE EXAMPLE 3

A commercially available brightness enhancement film, CM-30 (EFUN Company), which has a prism columnar microstructure.

COMPARATIVE EXAMPLE 4

A commercially available brightness enhancement film, PTR713 (SHINWHA Company), which has a prism columnar microstructure.

The optical film and the commercially available brightness enhancement films of Comparative Examples 1 to 4 were tested for various properties, and the results are shown in Tables 1 and 2 below.

Test Methods

Luminance Measurement Method: The samples were tested by the BM-7® instrument of Topcon Company for the luminance gain. The results are listed in Table 1.

Haze and Total Transmittance Test: According to JIS K7136 standard method, the test samples were measured for a haze (Hz) and total transmittance (Tt) with a NDH 5000 W Haze Meter (Nippon Denshoku Industries Co., Ltd.). The results are listed in Table 2 below.

Pencil Hardness Test: According to JIS K-5400 method, the test samples were tested with a Pencil Hardness Tester

[Elcometer 3086, SCRATCH BOY], using Mitsubishi pencil (2H, 3H) for the pencil hardness of the microstructure layer. The results of the test are shown in Table 2 below.

Scratch Resistance Test: A Linear Abraser [TABER 5750] was used, and a 3M BEF-III-10T film (20 mm length×20 mm width) was affixed on a 600 g platform (area: 20 mm length× 20 mm width). The test samples were tested for scratch resistance under pressure directly on the prismatic microstructure layer of the film. The scratch resistance test was performed in 10 cycles with a test path of 2 inch and a speed of 10 cycle/min. The results of the test are listed in Table 2 below.

Surface Resistivity Test: The surface resistivity of the samples was measured with a Superinsulation Meter [EASTASIA TOADKK Co., SM8220&SME-8310, 500 V]. The testing conditions were: 23±2° C., 55±5% RH. The results of the test are shown in Table 2 below.

TABLE 1

| No. | Luminance gain |
| --- | --- |
| Example 1 | 26.54% |
| Example 2 | 21.54% |
| Comparative Example 4 | 11.32% |

TABLE 2

| | Haze Hz (%) | Total transmittance Tt (%) | Pencil Hardness (microstructure layer) | Scratch Resistance (microstructure layer) | Surface Resistivity $\Omega/\square$ (scratch-resistant layer) |
| --- | --- | --- | --- | --- | --- |
| Comparative Example 1 | 89.38 | 9.51 | H | Scratch | $3.12 \times 10^{13}$ |
| Comparative Example 2 | 90.85 | 11.66 | F | Severe Scratch | $4.56 \times 10^{14}$ |
| Comparative Example 3 | 91.40 | 14.10 | F | Severe Scratch | $2.45 \times 10^{16}$ |
| Comparative Example 4 | 87.72 | 60.21 | 3H | No Scratch | $2.99 \times 10^{15}$ |
| Example 1 | 83.91 | 50.69 | 3H | No Scratch | $2.99 \times 10^{11}$ |
| Example 2 | 74.24 | 61.88 | 3H | No Scratch | $2.99 \times 10^{15}$ |

It can be seen from the results in Table 1 that the optical films of the present invention have a better luminance gain as compared with conventional brightness enhancement film and can achieve a better brightness enhancing effect. It can be seen from the results in Table 2 that the optical films of the present invention have a better hardness and high-pressure scratch resistance as compared with conventional brightness enhancement films with a prism columnar structure and can effectively avoid the damage of the microstructure layers of the optical films and consequently save the costs associated with upper diffusion films and protective films. The optical films of the present invention can not only avoid the damage of the microstructure layers but also provide a brightness enhancing effect, and can be used as scratch-resistant brightness enhancement films in backlight modules.

We claim:

1. An optical film comprising a substrate having a first optical surface and a second surface and a microstructure layer on the first optical surface of the substrate, wherein the microstructure layer comprises a plurality of first light-adjusting structures selected from prism columnar structures and a plurality of second light-adjusting structures selected from arc columnar structures, wherein 20% to 60% of the second light-adjusting structures has a height greater than that of all the first light-adjusting structures, wherein the prism columnar structures have an apex curvature radius of less than 2 µm, and wherein the arc columnar structures have an apex curvature radius between 2 µm and 50 µm.

2. The optical film as claimed in claim 1, wherein the height of the first light-adjusting structures or the second light-adjusting structures is in the range from 5 µm to 100 µm.

3. The optical film as claimed in claim 1, wherein at least two or more of the light-adjusting structures are non-parallel to each other.

4. The optical film as claimed in claim 3, wherein the non-parallel light-adjusting structures are selected from the group consisting of non-parallel prism columnar structures, non-parallel arc columnar structures, non-parallel prism columnar structures and arc columnar structure, or a combination thereof.

5. The optical film as claimed in claim 4, wherein the non-parallel light-adjusting structures are in a crossed or non-crossed form in the microstructure layer.

6. The optical film as claimed in claim 1, wherein the prism columnar structures or arc columnar structures have a nominal height, wherein at least a portion of the columnar structures have heights that change randomly along the length direction with a changing magnitude of at least 5% of the nominal height.

7. The optical film as claimed in claim 6, wherein the changing magnitude is 5% to 50% of the nominal height.

8. The optical film as claimed in claim 1, wherein the prism columnar structures have an apex angle between 40° and 120°.

9. The optical film as claimed in claim 1, further comprising a scratch-resistant layer on the second optical surface of the substrate.

10. The optical film as claimed in claim 9, wherein the scratch-resistant layer is formed from a resin selected from the group consisting of a UV curable resin, a thermal setting resin or a thermal plastic resin, or a mixture thereof.

11. The optical film as claimed in claim 10, wherein the scratch-resistant layer is composed of a resin containing diffusion particles.

12. The optical film as claimed in claim 11, wherein the diffusion particles have a particle size of from about 1 µm to about 15 µm.

13. The optical film as claimed in claim 11, wherein the diffusion particles are organic particles selected from an acrylate resin, a methacrylate resin, a styrene resin, a urethane resin, or a silicone resin, or a mixture thereof, and/or inorganic particles selected from zinc oxide, silicon dioxide, titanium dioxide, zirconia, alumina, zinc sulfide, or barium sulfate, or a mixture thereof.

14. The optical film as claimed in claim 11, wherein the diffusion particles are in an amount in the range from about 0.1 parts by weight to about 10 parts by weight per 100 parts by weight of the solids content of the resin for forming the scratch-resistant layer.

15. The optical film as claimed in claim 10, wherein the UV curable resin is formed from at least one acrylic monomer or acrylate monomer having one or more functional groups.

16. The optical film as claimed in claim 15, wherein the acrylate monomer is selected from the group consisting of a methacrylate monomer, an acrylate monomer, a urethane acrylate monomer, a polyester acrylate monomer, and an epoxy acrylate monomer.

17. The optical film as claimed in claim 15, wherein the UV curable resin further comprises an acrylate oligomer.

18. The optical film as claimed in claim 10, wherein the thermal setting resin is selected from the group consisting of a carboxyl (—COOH) and/or hydroxyl (—OH) group-containing polyester resin, epoxy resin, polymethacrylate resin, polyamide resin, fluoro resin, polyimide resin, polyurethane resin, and alkyd resin, and a mixture thereof, and the thermal plastic resin is selected from the group consisting of polyester resins; polymethacrylate resins, and a mixture thereof.

19. The optical film as claimed in claim 9, wherein the microstructure layer and/or scratch-resistant layer comprise an anti-static agent selected from the group consisting of ethoxy glycerin fatty acid esters, quaternary amine compounds, aliphatic amine derivatives, epoxy resins, siloxane, or alcohol derivatives.

20. The optical film as claimed in claim 9, wherein the microstructure layer and scratch-resistant layer have a surface resistivity of less than $1013\Omega/\square$.

21. The optical film as claimed in claim 1, wherein the microstructure layer comprises diffusion particles.

22. The optical film as claimed in claim 21, wherein the diffusion particles are organic particles selected from an acrylate resin, a methacrylate resin, a styrene resin, a urethane resin, or a silicone resin, or a mixture thereof, and/or inorganic particles selected from zinc oxide, silicon dioxide, titanium dioxide, zirconia, alumina, zinc sulfide, or barium sulfate, or a mixture thereof.

23. The optical film as claimed in claim 21, wherein the diffusion particles have a particle size in the range from about 1 μm to about 30 μm.

24. The optical film as claimed in claim 1, for use as a brightness enhancement film in a display.

* * * * *